(12) United States Patent
Brown et al.

(10) Patent No.: US 11,818,239 B2
(45) Date of Patent: *Nov. 14, 2023

(54) SYSTEM AND METHOD FOR AUTOMATICALLY SYNCHRONIZING RESPONSES TO CONDITIONS ON DEVICES

(71) Applicant: Google LLC, Mountain View, CA (US)

(72) Inventors: Jeffrey Brown, Mountain View, CA (US); Kristopher Giesing, Palo Alto, CA (US); Steffen Meschkat, Menlo Park, CA (US); Alhaad Gokhale, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 17/078,178

(22) Filed: Oct. 23, 2020

(65) Prior Publication Data

US 2021/0044414 A1 Feb. 11, 2021

Related U.S. Application Data

(63) Continuation of application No. 15/808,153, filed on Nov. 9, 2017, now Pat. No. 10,855,436.

(51) Int. Cl.
*H04L 7/00* (2006.01)
*H04L 69/329* (2022.01)
(Continued)

(52) U.S. Cl.
CPC ............. *H04L 7/0008* (2013.01); *G06F 8/61* (2013.01); *G06F 16/178* (2019.01); *H04L 67/01* (2022.05); *H04L 69/329* (2013.01); *H04L 67/02* (2013.01)

(58) Field of Classification Search
CPC ...... H04L 7/0008; H04L 67/42; H04L 69/329
(Continued)

(56) References Cited

U.S. PATENT DOCUMENTS 10,061,613 B1   8/2018 Brooker et al.
10,606,660 B1 * 3/2020 Hartley ................. G06F 9/5066
(Continued)

FOREIGN PATENT DOCUMENTS

CN   1781118 A   5/2006
CN   1892652 A   1/2007
(Continued)

OTHER PUBLICATIONS

EP Office Action for Application No. 18762954.8 dated Nov. 20, 2020.

(Continued)

*Primary Examiner* — David R Lazaro
*Assistant Examiner* — Mariegeorges A Henry
(74) *Attorney, Agent, or Firm* — Botos Churchill IP Law (57) ABSTRACT

A system and method are provided that permits different devices with different applications to respond to the occurrence of a condition in a similar manner. By way of example, trigger data may be synchronized across multiple devices, wherein trigger data identifies information to be provided to a program in response to the occurrence of a condition. If a program is not installed or running on a particular device when the trigger occurs, the device automatically installs and executes the application.

21 Claims, 4 Drawing Sheets

(51) Int. Cl.
*G06F 8/61* (2018.01)
*G06F 16/178* (2019.01)
*H04L 67/01* (2022.01)
*H04L 67/02* (2022.01)

(58) Field of Classification Search
USPC ................................................ 709/203, 220
See application file for complete search history.

(56) References Cited

U.S. PATENT DOCUMENTS

| | | | |
|---|---|---|---|
| 2002/0194334 A1* | 12/2002 | Focant | H04L 12/2856 709/225 |
| 2010/0011352 A1 | 1/2010 | Chu et al. | |
| 2013/0055237 A1 | 2/2013 | Fei et al. | |
| 2013/0326502 A1* | 12/2013 | Brunsman | G06F 8/61 717/177 |
| 2014/0359602 A1 | 12/2014 | Sawaya et al. | |
| 2015/0113034 A1* | 4/2015 | Tome | H04L 67/10 709/201 |
| 2017/0140408 A1* | 5/2017 | Wuehler | G06Q 30/0207 |
| 2018/0088928 A1 | 3/2018 | Smith et al. | |
| 2018/0316637 A1* | 11/2018 | Desjardins | H04L 65/4025 |

FOREIGN PATENT DOCUMENTS

| | | | | |
|---|---|---|---|---|
| CN | 101763283 A | | 6/2010 | |
| CN | 103457994 A | | 12/2013 | |
| CN | 103514010 A | | 1/2014 | |
| CN | 106100909 A | | 11/2016 | |
| JP | 2016126419 A | * | 7/2016 | ............ G06F 8/61 |
| SG | 65350 | | 6/1999 | |
| WO | WO-2012105764 A3 | * | 12/2012 | ............ G06F 13/102 |
| WO | 2015078281 A1 | | 6/2015 | |

OTHER PUBLICATIONS

"Fuchsia-mirror/ledger/docs", [online]. Retrieved Nov. 30, 2017. Retrieved from the internet: <https://github.com Fuchsia-mirror/ledger/blob/20244de98604f39aaa261 bf6ab4e30cbbf1 b0a7f/docs/workflow .md>, 1 page, Oct. 27, 2016.

"Fuchsia-mirror/ledger/docs/user_guide", [online]. Retrieved Nov. 30, 2017. Retrieved from the internet: <ledger/user_guide.md at 20244de98604f39aaa261bf6ab4e30cbbf1 b0a7f - fuchsia-mirror/ledger - GitHub>, 1 page, Oct. 27, 2016.

"Fuchsia-mirror/ledger/READEME", [online]. Retrieved Nov. 30, 2017. Retrieved from the internet: <https://github.com/fuchsia-mirror/ledger/blob/20244de98604f39aaa261 bf6ab4e30cbbf1 b0a7f/README.md>, 1 page, Nov. 8, 2016.

"Fuchsia-mirror/ledger/services", [online]. Retrieved Nov. 30, 2017. Retrieved from the internet: <https://github.com/fuchsia-mirror/ledger/blob/20244de98604f39aaa261 bf6ab4e30cbbf1 b0a 7f/services/ledger.fidl>, 5 pages, Nov. 7, 2016.

"Fuchsia-mirror/ledger/src", [online]. Retrieved Nov. 30, 2017. Retrieved fiom the internet: <https://github.com/fuchsia-mirror/ledger/tree/20244de98604f39aaa261 bf6ab4e30cbbf1 b0a7f/src>, 1 page, Nov. 8, 2016.

International Search Report and Written Opinion for PCT Application No. PCT/US2018/045774, dated Nov. 22, 2018. 14 pages.

Ketan Bhardwaj, Ada Gavrilovska and Karsten Schwan, Ephemeral Apps, 2016, 6 pages.

Extended European Search Report for Application No. EP22182809 dated Oct. 7, 2022.

The First Office Action for Chinese Patent Application No. 201880027939.3, dated Sep. 14, 2022.

Notice of Grant for Chinese Patent Application No. 201880027939.3, dated Apr. 20, 2023.

* cited by examiner

SYSTEM AND METHOD FOR AUTOMATICALLY SYNCHRONIZING RESPONSES TO CONDITIONS ON DEVICES

CROSS-REFERENCE TO RELATED APPLICATIONS

This application is a continuation of U.S. application Ser. No. 15/808,153, filed Nov. 9, 2017, the entire disclosure of which is incorporated herein by reference.

BACKGROUND OF THE INVENTION

"Ephemeral" computing systems have been proposed wherein programs and data may be downloaded on demand. For example, if a user is running out of space on a device, the system may copy an application and its associated data to the cloud and delete the local copy of the application and its associated data from the device. In response to a user indicating that they want to run the application, the device may automatically download the application and its associated data from the cloud and initiate execution.

Various systems have been proposed for synchronizing data across multiple devices. For example, the creation and modification of document files stored by a user on one device may be automatically replicated on other devices used by the user.

BRIEF SUMMARY OF THE INVENTION

One aspect of the technology described herein relates to a method of installing programs. The method includes: accessing, with one or more computing devices, a trigger stored in memory, the trigger being an association between a set of parameters and a program; determining, with the one or more computing devices, whether a condition has occurred based on a comparison of information received at a first device with the set of parameters associated with the trigger; determining, with the one or more computing devices when the condition is determined to have occurred, whether the program associated with the trigger is installed on the first device; when the program associated with the trigger is not installed on the first device, providing a request for the program associated with the trigger and receiving, at the first device from a second device via a network in response to the request, an installation file of the program; installing, on the first device, the program associated with the trigger based on the installation file; and providing, with the one or more computing devices, a message associated with the trigger to the program associated with the trigger after the program associated with the trigger is installed.

Another aspect of the technology relates to a first computing device that includes one or more processors and first memory storing instructions. The instructions are executable by the one or more processors and include: receiving a first set of condition parameters and first message data from a first program installed on a first computing device; storing first trigger data in the first memory, wherein trigger data comprises a set of condition parameters, a program identification value and message data, and wherein the set of condition parameters of the first trigger data comprises the first set of condition parameters, the program identification value of the first trigger data is associated with an identifier of the first program, and the message data of the first trigger data comprises the first message data; providing the first trigger data to a second computing device; receiving second trigger data stored on the second computing device, wherein the second trigger data comprises a second set of condition parameters provided by a second program installed on the second computing device, the program identification value of the second trigger data is associated with an identifier of the second program, and the message data of the second trigger data comprises second message data provided by the second program; storing the second trigger data in the first memory; determining whether the first set of condition parameters is satisfied; when the first set of condition parameters is determined to be satisfied, providing data based on the first message data to the first program; determining whether the second set of condition parameters is satisfied; and when the second set of condition parameters is determined to be satisfied, providing data based on the second message data to a copy of the second program stored on the first computing device.

Yet another aspect of the technology relates to a non-transitory computing-device readable storage medium on which computing-device readable instructions are stored. The instructions, when executed by one or more computing devices, cause the one or more computing devices to perform a method that includes: synchronizing, on a given device of a plurality of computing devices, a set of triggers stored on the given device with a set of triggers stored on other computing devices of the plurality of computing devices, wherein each trigger comprises data that associates a condition that is detectable by the given device with information to be provided to a program installed on the given device when the condition occurs; determining, at the given device of the plurality of computing devices, whether a first condition of a first trigger of the set of triggers has occurred, the first trigger comprising first information to be provided to the program in response to determining that the first condition has occurred; when a copy of the program on the given device is unable to receive the first information, enabling a copy of the program on the given device to receive the first information by (a) downloading and installing a copy of the program onto the given device if the program is not installed on the given device and (b) running a copy of the program on the given device if the program is not running; and providing the first information to the copy of the program on the given device when said copy is able to receive the first information.

DETAILED DESCRIPTION

I. Overview

Aspects of the technology described herein relate to systems and methods for different devices to respond similarly to the occurrence of an event notwithstanding the fact that the devices, as well as their then-current relevant programs and data, are different from each other.

Figure 2:
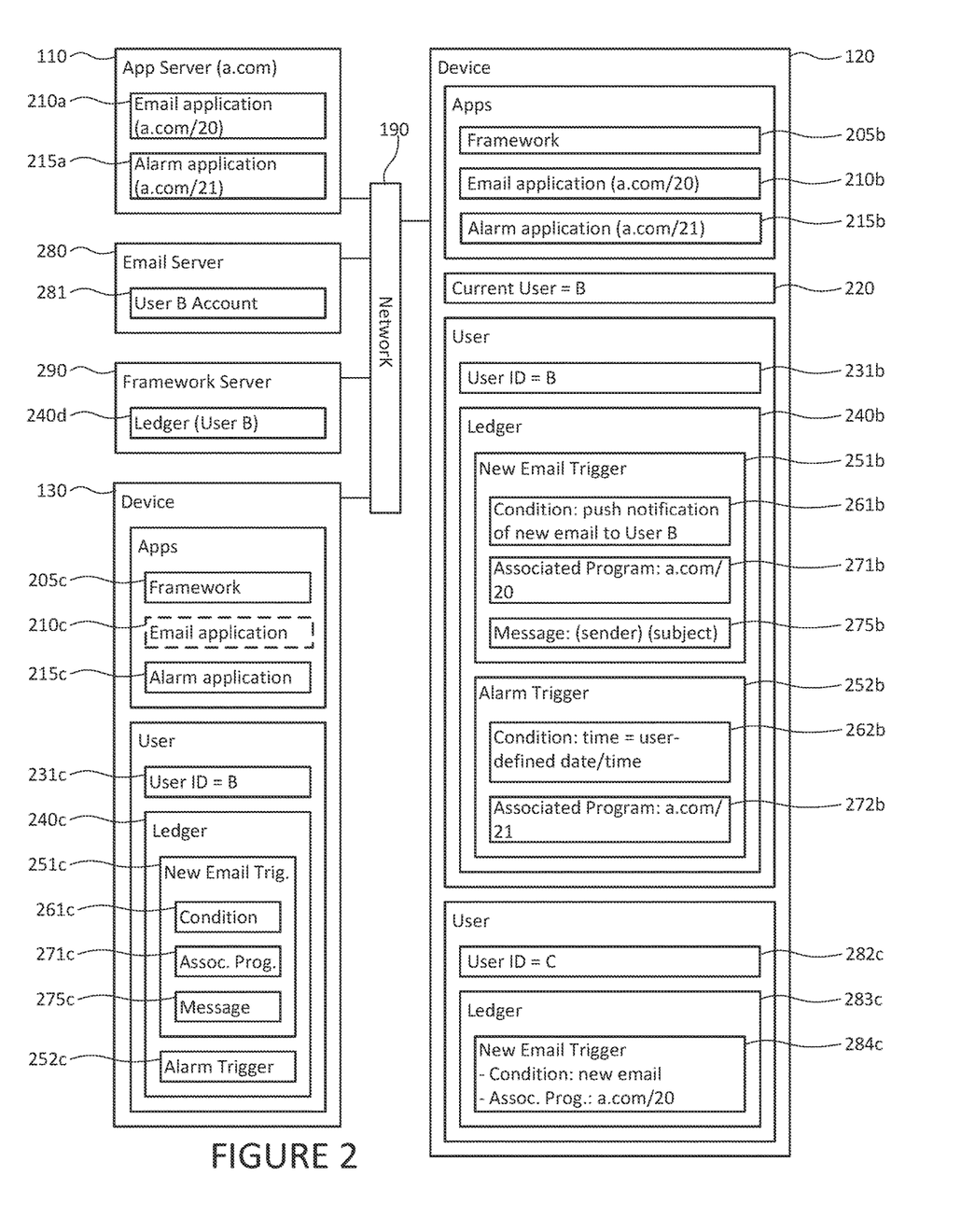
FIG. 2 is an example of the synchronization of trigger data across multiple devices.
Figure 3:
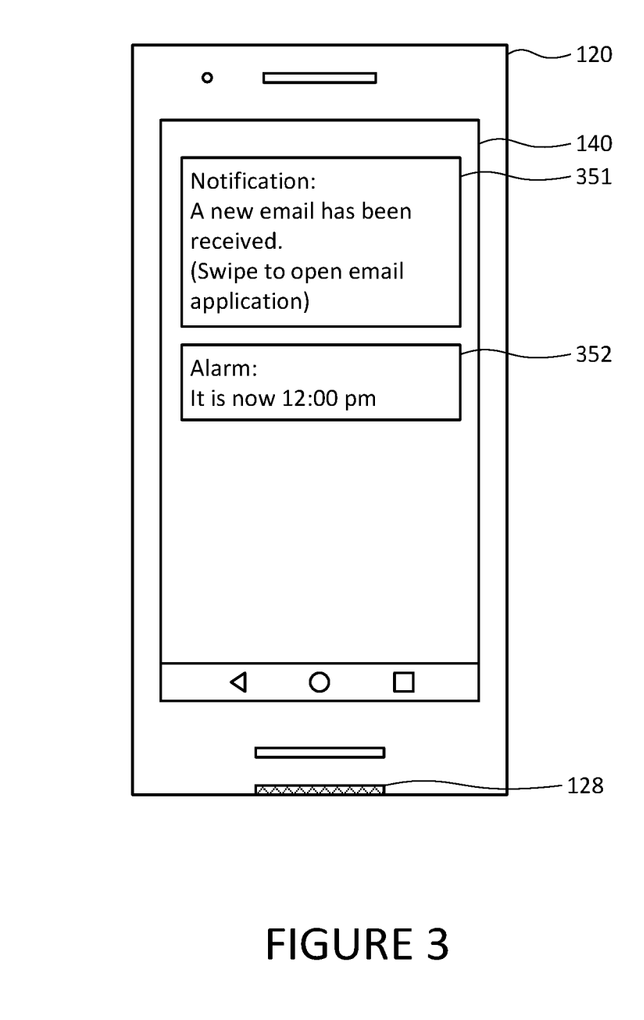
FIG. 3 is an example of information that may be displayed on a device in response to the occurrence of a condition associated with a trigger

By way of example and as shown in FIG. 2, device 120 may store triggers 251b and 252b that associate programs (e.g., applications 210b and 215b) with conditions that may occur (e.g., conditions 261b and 262b, respectively). Framework 205b may notify the relevant applications if and when the relevant conditions occur and, as shown in FIGS. 3 and 4, the applications may notify the user or take other actions.

Specific triggers may be associated with specific users, and a user's trigger's may be replicated among the user's devices. For instance, each time another application on device 120 adds a new trigger to the ledger 240b associated with user 150 (User B), the same trigger may be added to the ledger 240c on another device used by user 150, e.g., device 130.

Triggers may be loaded and monitored on a device before the trigger's associated programs are installed. For instance, if trigger 251c was installed on device 130 because of the creation of corresponding trigger 251b on device 120, and if trigger 251c occurs before application 210c associated with trigger 251c occurs, then device 130 may automatically install application 210c on device 120 and notify the application of the trigger's occurrence.

Figure 4:
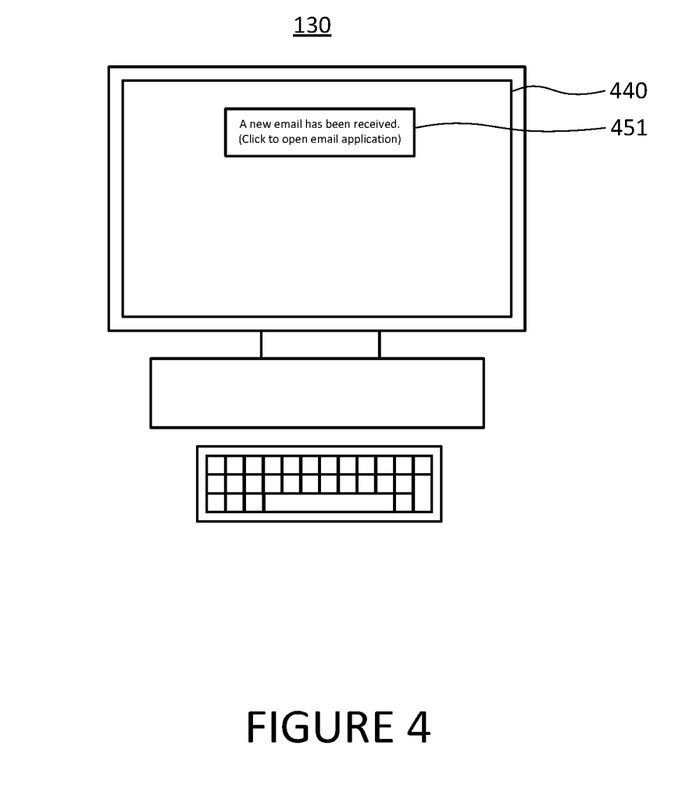
FIG. 4 is an example of information that may be displayed on another device in response to the occurrence of a condition associated with a trigger

As shown in FIG. 4, the user experience in response to the occurrence of a trigger may be substantially the same in across the user's devices. For instance, regardless of whether one device is a cell phone and the other device is a desktop computer, and regardless of whether one of the devices had a copy of the application at the time the trigger occurred, the user may still receive a substantially similar notification on both devices when the trigger does occur.

II. Example Systems

Figure 1:
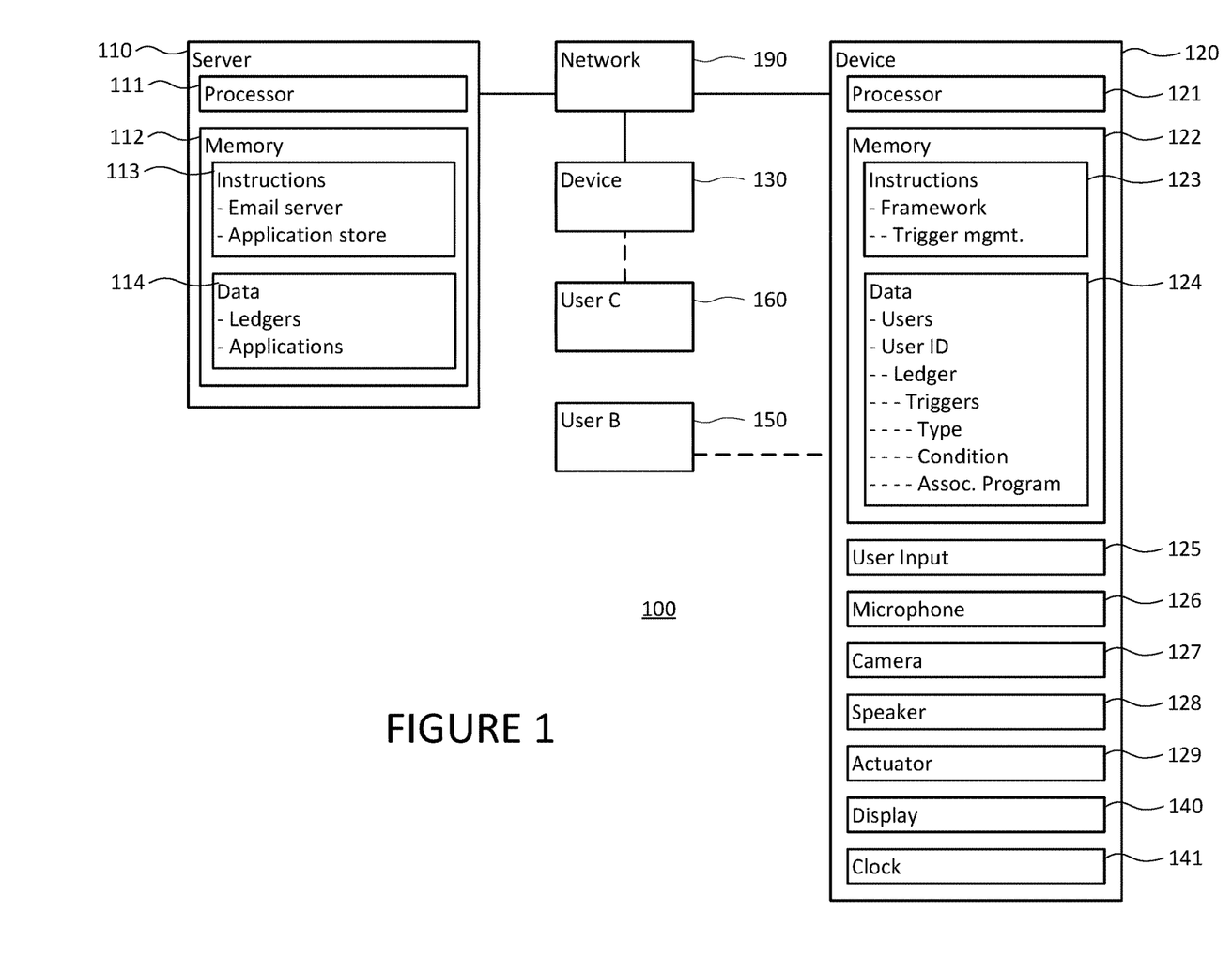
FIG. 1 is a functional diagram of a system in accordance with aspects of the disclosure.

Systems such as those described above may include one or more computing devices. For instance, FIG. 1 provides the example of system 100, which includes computing devices 110, 120 and 130. The computing devices are configured to accept information, perform operations based on that information, and take an action or provide additional information in response. The computing devices may be, or include, a processor that is capable of receiving one or more electrical signals representing information expressed as a numerical value as input, determine a numerical value based on the input in accordance with instructions, and provide one or more electrical signals that represent the determined numerical value as output. Device 110 includes processor 111, which may be a commercially available central processing unit (CPU), application-specific integrated circuit (ASIC) or field-programmable gate array.

The instructions used by a computing device include any set of one or more instructions that are accessed and executed by the computing device. By way of example, device 110 stores values representing instructions 113 and processor 111 is able to access those values and perform, or cause other components of device 110 or system 100 to automatically perform, operations associated with those instructions. Instructions 113 may be stored in a format that is capable of execution by processor 111 with or without additional processing, e.g., machine code, object code, script, or independent source code modules that are interpreted on demand. An operation expressed as a single instruction in one format may correspond with multiple instructions in another format, e.g., executing a single command in script may require the execution of multiple machine code instructions. Some of the operations described herein may involve the execution of instructions provided by an operating system.

The instructions may be stored in a memory. For instance, instructions 113 are stored in memory 112. The memory may be any component that is capable of storing information on a non-transitory storage medium that can be read by a computing device, e.g., registers provided by processor 111, volatile memory such as RAM (random-access memory), non-volatile memory such as flash memory (e.g., a Secure Digital (SD) card), a hard-disk drive, a solid-state drive, optical storage, or tape backups. Device 110, processor 111 and memory 112 are configured so that processor 111 can read, modify, delete and add values stored in memory 112. Memory may be configured to provide less access than the example of memory 112, e.g., the memory may be read-only.

Memory may store information that is used by, or results from, the operations performed by the computing device. By way of example, memory 112 stores data 114, which includes values that are retrieved or stored by processor 111 in accordance with instructions 113, such as information that is required or determined by device 110 when performing some of the operations described herein. Values stored in memory 112 may be stored in accordance with one or more data structures. For instance, a value stored in memory 112 may represent a single numeric value (e.g., a binary number, an integer, a floating point number, a Unicode value representing a single character of text, digit or punctuation mark, or a value representing a single machine code instruction), a set of multiple numeric values (e.g., an array of numbers, a string of text characters, XML-formatted data, or a file), or information from which values to be processed in accordance with instructions 113 may be obtained (e.g., a reference to a value stored at a remote location or a parameter of a function from which the required value is calculated).

A computing device may include components for receiving information from the physical environment surrounding the device to allow direct user input to the device. Similar to device 110, device 120 includes a processor 121, memory 122, instructions 123 and data 124. Device 120 also includes components that detect information relating to the physical environment in which the component is disposed, and this information may include information provided by user 150. Device 110 includes a user input component 125 having circuitry and other components configured to receive input from user 150, such as information provided tactilely (e.g., a mouse, keyboard, keypad, button or touchscreen). User input components may perform functions that are not primarily directed to user input. By way of example, camera 127 may be used to capture user commands (e.g., hand gestures) and other visual information (e.g., the visual characteristics of a mountain). Microphone 126 may be used to capture user commands (e.g., verbal commands) and other audio information (e.g., the sound of a waterfall).

A computing device may include components for providing information via the physical environment surrounding the device to provide output directly to users. For example, a component may include circuitry that outputs visual, audio or tactile (e.g., haptic) information to users of the device, such as display 140 (e.g., a computer monitor, a touchscreen, a projector or another component that is operable to change a visual characteristic in response to a signal), speaker 128, or actuator 129 to vibrate the device.

A computing device may include one or more components for communicating with other computing devices. By way of example, devices 110, 120 and 130 include circuitry (e.g., a network interface) connecting each device to a different node of communication network 190. Network 190 may be composed of multiple networks using different communication protocols. For instance, when device 110 transmits information to device 120, the information may be sent over one or more of the Internet (e.g., via core Internet routers in accordance with the Transmission Control Protocol (TCP) and Internet Protocol (IP)), a cellular network (e.g., in accordance with the LTE (Long-Term Evolution) standard), a local network (e.g., an Ethernet or Wi-Fi network), or a Bluetooth connection. A device may provide information to a user via other devices, e.g., device 110 may display information to user 150 by sending the information via network 190 to device 120 for display on display 140. A computing device may also provide information to another computing device without the use of a network. By way of example, one computing device may output information with a display and another computing device may detect that information with a camera. Although only a few computing devices are depicted in FIG. 1, the system may include a large number of computing devices that are connected to the network at a large number of nodes.

Although FIG. 1 shows computing devices 110 and 120 as individual blocks, each of which contains its own processor and memory, the operations described herein may involve a single computing device or many computing devices, e.g., in the "cloud". For example, various operations described below as involving a single computing device (e.g., a single central processing unit (CPU) in a single server) may involve a plurality of computing devices (e.g., multiple processors in a load-balanced server farm or otherwise having a distributed configuration). Similarly, memory components at different locations may store different portions of instructions 113 and collectively form a medium for storing the instructions. By way of further example, operations described as involving a plurality of computing devices may be performed by a single computing device, e.g., rather than sending data to device 110 for processing, device 120 may process the data itself. Alternatively, device 120 may function as a "thin" client wherein device 110 performs all or nearly all operations that are not directly related to receiving and providing information to user 150 via user input component 125 and display 140. Various operations described herein as being performed by a computing device may be performed by a virtual machine. By way of example, instructions 113 may be specific to a Windows server, but the relevant operations may be performed by a Linux server running a hypervisor that emulates a Windows server. The operations may also be performed by a container, e.g., a computing environment that does not rely on an operating system tied to specific types of hardware.

In many of the examples described herein, device 110 is a server and devices 120, 130 are client devices. For instance, device 110 may be a web server and device 120 may be a desktop computer system, e.g., processor 121 and memory 122 may be contained in a desktop personal computer, display 140 may be an external monitor connected to the personal computer by a cable, and user input component 125 may be an external keyboard that communicates with the computer via Bluetooth. Alternatively, device 120 may be a wireless phone with a touchscreen that functions as both display 130 and user input component 125. Other client devices may include, by way of example, laptops, notebooks, netbooks, tablets, set-top boxes (e.g., a cable-television set-top box connected to a television) and wearable devices (e.g., a smartwatch). In that regard, a computing device may include other components that are typically present in such devices or general purpose computers but are not expressly described herein.

The data stored in memory may include an association between a condition that may occur and a program (such associations hereafter referred to as a "trigger"). For example, the data associated with a trigger's program may include a value that identifies an application, a routine, or other instructions. The program identifier may be a unique identifier such as a URL from which the binary code of the program was or may be retrieved, the program's location on the device, a unique identifier provided by the source of the application (e.g., a server-based app store), etc. The condition may be expressed as one or more parameter values. For example, if the trigger's associated program is an email application installed on the device, the condition for the trigger may be the arrival of a new email at an email account associated with the device's user, and the condition's parameters may include a server token representing a new email event. A trigger may be based on any condition or set of conditions that are detectable by the device.

A trigger's data may also be associated with a message value to be provided to the associated program when the condition occurs. For example, the trigger may be associated with a set of parameter that define the information to be included in the message, such as the sender and subject line of an email that resulted in the trigger's occurrence. Alternatively, a trigger may not define the content of the message, in which case the message may include nothing more than an indication that the condition associated with the trigger has occurred.

A single device may store different types of triggers. For instance, a new email trigger may rely on push notifications from an email server to determine whether the condition is satisfied. Another type of trigger may be based on inter-process communications (IPC), e.g., a trigger whose condition is satisfied when the current time provided by a device's clock (such as clock 141) matches a date/time defined by the trigger's parameter.

A set of one or more triggers may be replicated across multiple devices (such a set referred to hereafter as a "ledger"), and each ledger may be associated with one or more users. For instance, FIG. 2 provides an example of a system wherein each computing device 120, 130 and 290 stores a ledger associated with a particular user, namely, ledgers 240*b*, 240*c* and 240*d*, respectively. System 100 may synchronize the ledgers so that changes made to a trigger in the user's ledger stored on one device, such as ledger 240*b*, are reflected in the user's ledgers stored on the other devices, e.g., ledgers 240*c* and 240*d*. A single device may store than one ledger, e.g., computing device 120 stores two different ledgers 240*b* and 283*c* associated with two different user identification values, namely user ID 231*b* ("B") and user ID 282*c* ("C"), respectively. Triggers may also be stored or processed separately from a ledger, e.g., triggers may be transient in local memory, persisted to a storage medium, restored from a storage medium, or transferred across a communication channel.

As explained in more detail below, instructions 113 may include instructions for managing triggers. By way of example and as explained in more detail below, the instructions on a particular device may include a set of routines that are configured to: process requests from associated programs on the device to add triggers to the device's ledger, determine whether a trigger occurred by comparing data or signals from components located on or off of the device with a trigger's condition parameters, provide messages to associated programs on the device when a trigger occurs, provide notifications to a user of the device when a trigger occurs, synchronize the data stored in ledgers on the device with ledgers stored on different devices, and notify users when a trigger has occurred. For ease of reference, the instructions performing these functions are represented in FIG. 2 by a single block labelled framework 205b. Although framework 205b is shown as a separate block from ledger 283c and the block containing ledger 283c only contains data, the system may store and process trigger-related instructions and data in other combinations than those shown in FIG. 2. For example, ledger 283c may be instantiated as one or more objects that encapsulate trigger data and contain routines for managing the trigger data that can be called by other programs or respond to events raised by other components of the system.

The framework may be configured as an API (application programming interface) wherein the framework's functions are invoked by calling a routine of the framework. As discussed in more detail below, some of the routines of the framework may be idempotent. The framework may also be configured as part of the operating system of a device. The framework may further include an agent application that provides or receives services to and from other applications on the device.

III. Example Methods

Operations in accordance with a variety of aspects of the method will now be described. It should be understood that the following operations do not have to be performed in the precise order described below. Rather, various steps can be handled in different order or simultaneously.

Triggers may be added to a device in response to requests from programs or other components stored on a device. By way of example and as shown in FIG. 2, User B may have logged in as the current user 220 of device 120 by providing his or her user ID using user input component 125. User B may have also downloaded email application 210b by requesting and receiving a copy of the native binary code version of email application 210a located at URL "a.com/20" on device 110. When the user first executes email application 210b, the application may call a routine of framework 205a that indicates the application wants to be notified in the event User B receives a new email in User B's email account 281 hosted by email server 280. In response, framework 205b may register trigger 251b in ledger 240b, which is associated with user ID 231 of User B. The framework may register trigger 251b by storing, in the memory of device 120, an association between a condition 261b and an associated program identifier 271b. The parameters of condition 261b may represent a push notification, such as a push notification from email server 280 whose content indicates that email account 281 associated with User B received a new email. The associated program 271b may be identified by its URL, e.g., the memory of device 120 may indicate that email application 210b was retrieved in response to a request to the URL "a.com/20". The system may also store the parameters of message 275b to be provided to the associated program if the conditions occur.

By way of further example, User B may use existing alarm application 215b to request an alarm at a specific date and time. In response, application 215b may call a routine of framework 205b that requests a notification at the specific date and time. Framework 205b may store a new trigger in ledger 240b that associates a unique identifier of email application 210b (e.g., URL "a.com/21") with condition 262b. The parameters of the trigger's condition 262b may represent a Boolean equation that compares the output of device's clock to the user-defined time of day.

Triggers may also be added to a device based on trigger-related data provided by other devices. For instance, the triggers associated with a particular user's ledgers may be synchronized across multiple devices. By way of example, when device 120 modifies the trigger data stored in ledger 240b of user 150 to include new email trigger 251b, framework 205b may send data representing the modification to any other devices storing a ledger associated with a user having the same user ID 231b as User B. In response to being notified of the modification, device 130 may add trigger 251c to ledger 240c, which is stored in device 130 and associated with the user ID 231c of User B. The parameters of condition 261c, associated program identifier 271c and message 275c stored on device 130 may be the same as the parameters of condition 261b, associated program identifier 271b and message 275b stored on device 120.

The trigger data stored in ledgers may be synchronized across multiple devices on a peer-to-peer to basis, relative to a specific copy stored in the cloud, or another basis. For example, device 120 may send modifications to ledger 240b to framework server 290, and server 290 may modify the trigger data stored in its ledger 240d to match ledger 240b. Server 290 may also notify device 130 of the change so device 130 can synchronize its ledger 240c with the ledger stored on server 290. If a device is offline or otherwise unavailable at the time a ledger on another device is modified, the ledger may be synchronized when the device becomes available.

A user may identify the devices that will store the user's trigger data. By way of example, when User B first uses device 120, User B may authenticate the device by entering his or her user identification and password via user input component 125. In response, framework 205b may query whether server 290 has a copy of a ledger associated with the user ID of User B. If so, framework 205b may download a copy of the ledger from server 290 to device 120. If not, device 120 may create a new ledger for User B and upload a copy of the ledger to server 290. Server 290 may also store a list of all of the devices authenticated by User B so the devices can be located and receive updates to their ledgers when connected to network 190. In that regard and in some aspects of the system, a device may download a copy of triggers for applications before the applications themselves are installed on the device.

Each device may determine if and when the conditions of the triggers stored on the device are satisfied. By way of example, device 120 may receive a push notification from email server 280 wherein the content of the push notification indicates that an email was received in email account 281 associated with user B. Upon receiving the notification, framework 205b may compare the content of the push notification with the parameters of condition 261b and condition 262b stored in ledger 240b. In response to determining that the push notification matches the parameters of condition 261b of new email trigger 251b, framework 205b may identify the associated program (e.g, email application 210b) based on the associated program identifier 271b. Framework 205b may then provide email application 210b with a message that conforms with the parameters of message 275b. By way of further example, framework 205b may periodically compare the current date and time of day with the specific date and time of day contained in condition 262b of alarm trigger 252b. If device 120 determines that the dates and times match, the framework may notify alarm application 215*b* that trigger 252*b* has occurred.

In some aspects, the system may not notify a program or the user in response to a trigger's occurrence unless the trigger is associated with the current user of the device or all of the users of the device. By way of example, device 120 may store information regarding another user, such as user ID 282*c* and ledger 283*c* associated with user 160 (User C). Since current user identifier 231*b* does not identify User C as the current user of device 120, and since trigger 284*c* is specific to User C, framework 205*b* may not check whether the condition associated with trigger 284*c* occurs or may forego providing the trigger's associated application with a message when the condition does occur.

The system's response to a trigger may be specific to the trigger's associated program. Continuing the aforementioned example, email application 210*b* may be configured to update an inbox stored on device 120 upon receiving notification from framework 205*b* that the new email trigger registered by the email application has occurred. As shown in FIG. 3, the email application may notify the user that a new email has been received by displaying notification 351 on display 140 of the device. An associated program may also be configured to display some of the content of a trigger's message. Similarly, alarm application 215*b* may respond to the occurrence of trigger 252*b* by displaying notification 352, playing an alarm sound via speaker 128, and activating actuator 129 to vibrate the device. In that regard, from a user interface perspective, the response to a trigger may depend on the features of a trigger's associated program.

If a trigger occurs when the associated program is asleep or not running, the device may wake or execute the application. For instance, if email application 210*b* is not running when trigger 251*b* occurs, framework 205*b* may issue a command to the operating system of device 120 to load and execute the application before the framework notifies the application of the trigger's occurrence.

A device's response to a trigger may also be independent of the associated programs. By way of example, if the framework cannot access a trigger's associated program when the trigger occurs, the framework may convert the message to human-readable text and display the text on the device's display.

Whether a user is notified of a trigger may depend on how the trigger's associated program responds to the trigger. For example, in the case of an alarm application, the application may respond to the occurrence of a time-based trigger by displaying a notification to the user. However, an application for viewing news articles may register a time-based trigger and, instead of alerting the user that the date/time defined by the trigger's parameters has occurred, may download and update a local store of news articles. A trigger's associated program will perform those tasks that it has been programmed to perform in response to a trigger's occurrence.

The system may synchronize data indicating whether a device has completed a particular action in response to a trigger's occurrence. For instance, a trigger may also be associated with a value that represents whether a user took an action that indicates the user acknowledged the occurrence. In that regard, if a user turns off the alarm associated with trigger 252*b*, alarm application 215*b* may notify framework 205*b* that the trigger has been acknowledged. The framework may modify ledger 240*b* of device 120 accordingly. When ledger 240*c* on device 130 is synchronized with ledger 240*b*, device 130 may cancel an action that alarm application 215*c* would normally take, e.g., the device's framework may not notify the application that the trigger has occurred, the framework may notify the alarm application that the trigger has been acknowledged, or the alarm application may query the state of the trigger before reminding a user of device 130 to acknowledge the alarm.

If a trigger occurs before the associated program has been installed on the relevant device, the associated program may be automatically installed. For example, whereas new email trigger 251*b* may have been added to ledger 240*b* in response to the user installing email application 210*b* on device 120, new email trigger 251*c* may have been added to ledger 240*c* of device 130 because the content of ledger 240*c* is synchronized with the content of ledger 240*b*. When device 130 determines that condition 261*c* of trigger 251*c* has been satisfied, the device may determine whether the trigger's associated application is able to receive the trigger's message. For instance, the device may determine whether the application is installed, e.g., whether the device's processors are able to load and execute from memory, without accessing an external network, the application's instructions for displaying the email. As a result, and particularly if device 130 was only recently authenticated by User B, the memory of device 130 may not include a copy of the email application identified by associated program identifier 271*c* when device 130 determines that condition 261*c* of trigger 251*c* has been satisfied.

The system may use the program identifier associated with the trigger to determine how to initiate installation or the relevant program. By way of example, the program identifier may identify a location on network 190 (e.g., a URL) from which an installation file for the application may be obtained (e.g., a copy of the native code of the application itself or files that may be used to download, extract and install the application). In that regard, if framework 205*c* is unable to identify the location of the associated email application when trigger 251*c* occurs, the framework may use the value of associated program identifier 271*c* (e.g., URL "a.com/20") to request a copy of the application. Upon receiving the installation file from an app server (e.g., device 110), framework 205*c* may automatically install email application 210*c*.

As noted above, if an application is unable to act on a message from a trigger because the application is not running, the framework may enable the application act on the message by initiating execution of the application. In that regard, after installing email application 210*c*, the framework may execute the application and notify it that a trigger associated with the application has occurred.

The installation of an associated program may occur automatically in response to a trigger without requiring the user to take any additional action. For instance, from a user's perspective, device 130 may respond to a new email in the exact same way as device 120 in spite of the fact that device 120 did not include a copy of an email application when the email was received. In other aspects of the system, certain triggers may require user approval of all or certain types of applications before installing a copies of applications onto a device that is different from the device upon which they were originally installed.

Rather than installing an entire associated program in response to a trigger's occurrence, a device may only install the functionality that is particular to processing the trigger. By way of example, associated program identifier 272*b* may only identify the portion of email application 210*a* that is necessary for a user to read the email. Device 130 may retrieve the remainder of the email application at a later time, e.g., when the device is idle or when the user attempts to access other functionality of the application.

Various aspects of the system may be idempotent. By way of example, the framework may comprise an API that only stores one copy of a trigger no matter how many times an application attempts to register a trigger with the same condition parameters and associated program identifier. By way of further example, to the extent an associated program may call the framework's API and request a list of the triggers that occurred within a given time period, the API may return only one message per trigger regardless of how often program calls the API's relevant routine. The deletion of triggers may also be idempotent, e.g., a trigger may be deleted multiple times on multiple devices, but the effect of deleting the trigger is the same.

Figure 5:
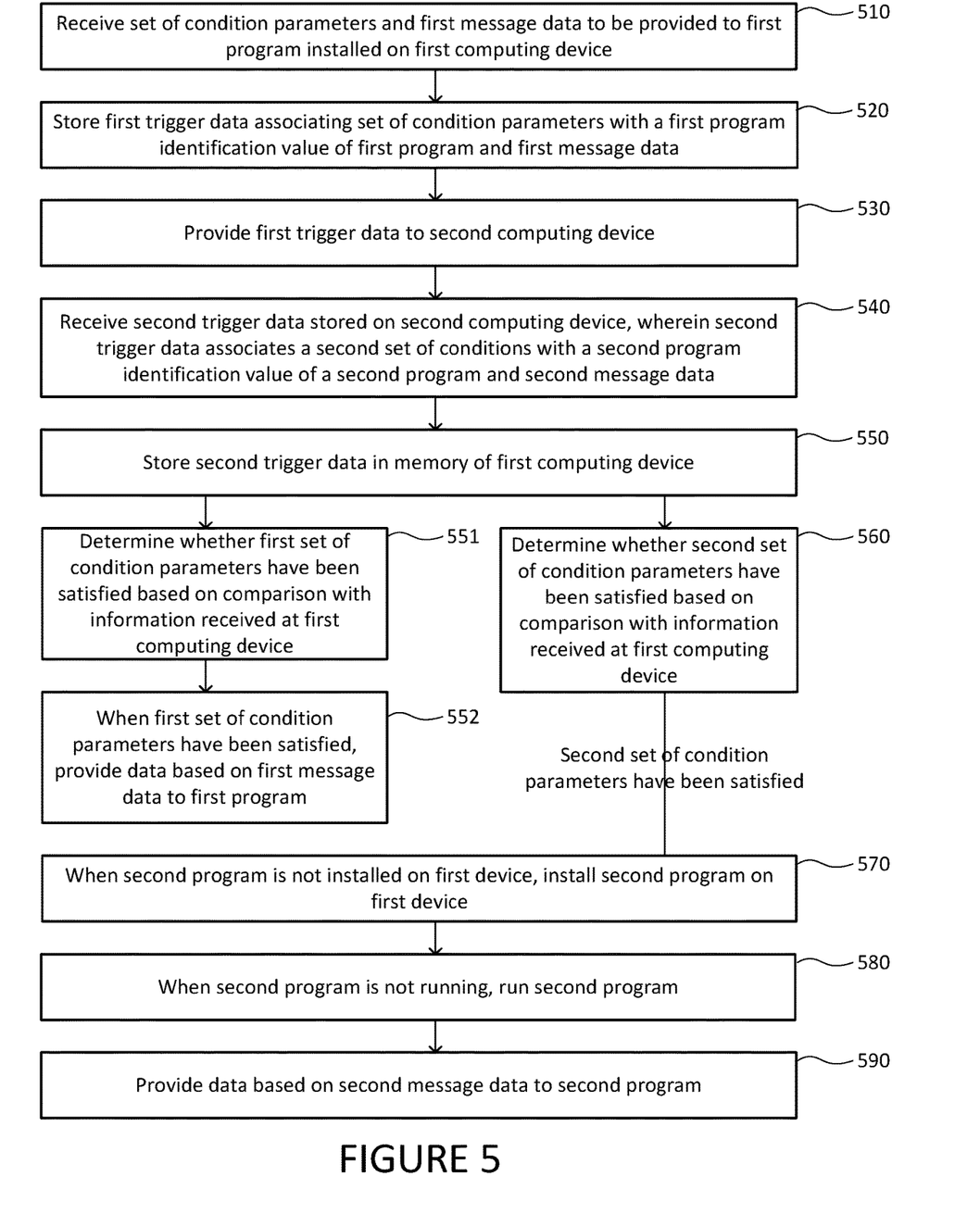
FIG. 5 is a flowchart accordance with aspects of the disclosure

FIG. 5 is a flowchart of some of the operations discussed above. FIG. 5 is a flowchart of some of the aforementioned operations. In block 510, set of condition parameters and first message data to be provided to a first program installed on a first computing device are received. In block 520, first trigger data associating the set of condition parameters with a first program identification value of the first program and first notification data is stored. In block 530, the first trigger data is provided to a second computing device. In block 540, second trigger data stored on a second computing device is received, wherein the second trigger data associates a second set of conditions with a second program identification value of a second program and second message data. In block 550, the second trigger is stored in the memory of the first computing device. In blocks 551 and 560, the system determines whether the first and second set of condition parameters have been satisfied based on a comparison of the condition parameters with information received at first computing device. In block 552, if the first set of condition parameters have been satisfied, data based on the first message data provided to the first program. Blocks 570, 580 and 590 are based on the premise that the second set of condition parameters have been satisfied. In block 570, if the second program is not installed on the first device, the second program is installed on the device. In block 580, if the second program is not running, the second program is run. In block 590, the second message data is provided to the second program.

Combinations of the foregoing features may provide particular advantages. By way of example, by automatically synchronizing trigger information across multiple devices, but not downloading and executing associated application until a trigger occurs, the system may provide an individual user with the experience of using multiple devices that function and react as if they are the same device. For instance, as shown in FIG. 4, device 130 may display a new email notification 451 on monitor 440 in response to a new email that is effectively identical to notification 351 on display 140 of device 120 notwithstanding the fact that device 120 may be a cell phone, device 130 may be a desktop computer, and device 130 did not include a copy of the email application at the time the email was received in the user's email account.

As these and other variations and combinations of the features discussed above can be utilized without departing from the claimed subject matter, the foregoing description of the embodiments should be taken by way of illustration rather than by way of limitation. The provision of examples (as well as clauses phrased as "such as," "e.g.", "including" and the like) should not be interpreted as limiting the claims to the specific examples; rather, the examples are intended to illustrate only some of many possible aspects. Unless expressly stated to the contrary, a "set" of items may contain a single item. References to "based on" and the like means "based at least in part on".

The invention claimed is:

1. A computing device comprising:
memory configured to store a set of triggers, each trigger of the set being configured to associate a respective program of a set of programs with one or more conditions stored in the memory, wherein a first one of the set of triggers is associated with a program identifier; and
one or more processors operatively coupled to the memory, the one or more processors being configured to:
determine that at least one of the one or more conditions associated with the first trigger has been satisfied;
determine that the respective program is not currently installed in the computing device; and
in response to the determinations that the at least one of the one or more conditions associated with the first trigger has been satisfied and that the respective program is not currently installed, obtain an installation file from a location on a network identified by the program identifier, and install the respective program on the computing device using the installation file.

2. The computing device of claim 1, wherein installation of the respective program on the computing device is performed in response to occurrence of the first trigger without requiring a user of the computing device to take any actions to install the respective program.

3. The computing device of claim 1, wherein installation of the respective program on the computing device is performed in response to occurrence of the first trigger in response to authorization of a user of the computing device.

4. The computing device of claim 1, wherein installation of the respective program on the computing device includes only installing functionality of the respective program that is particular to processing the first trigger.

5. The computing device of claim 1, wherein the one or more processors are further configured to use the program identifier to determine how to initiate installation of the respective program.

6. The computing device of claim 1, wherein a given condition of the one or more conditions associated with the first trigger is receipt of a push notification from a remote computing device.

7. The computing device of claim 6, wherein the push notification indicates that an electronic message was received for an account associated with a user of the computing device.

8. The computing device of claim 1, wherein the set of triggers is stored in memory as a ledger, the ledger being associated with a particular user of the computing device.

9. The computing device of claim 8, wherein the ledger is synchronizable with one or more other computing devices associated with the particular user.

10. The computing device of claim 9, wherein the first trigger is added to the memory of the computing device based on trigger data received from another computing device.

11. The computing device of claim 1, wherein the set of triggers is transient in the memory of the computing device.

12. The computing device of claim 11, wherein the first trigger is associated with a message value to be provided to the respective program when a given condition of the one or more conditions for the first trigger has been satisfied.

13. The computing device of claim 1, wherein the at least one condition is expressed as one or more parameter values of the respective program.

14. A computing system, comprising:
a plurality of computing devices according to claim 1, each of the plurality of computing devices being associated with a given user;
wherein the set of triggers is stored in each of the plurality of computing devices as a ledger, the ledger being associated with the given user in each of the plurality of computing devices.

15. The computing system of claim 14, wherein a change to the ledger on a first one of the plurality of computing devices is replicated across one or more other ones of the plurality of computing devices.

16. The computing system of claim 15, wherein the change to the ledger comprises adding a new trigger to the ledger of the first one of the plurality of computing devices.

17. The computing system of claim 14, wherein upon determination that at least one of the one or more conditions associated with the first trigger has occurred, a user interface of a first one of the plurality of computing devices is configured to notify the given user that an event has occurred for the respective program.

18. The computing system of claim 17, wherein a notification displayable via the user interface of the first computing device is equivalent to a notification displayable via a user interface of a second one of the plurality of computing devices.

19. The computing system of claim 14, wherein installation of the respective program on the a first one of the plurality of computing devices is performed in response to occurrence of the first trigger without requiring the given user to take any actions to install the respective program.

20. A method comprising:
storing, by one or processors of a computing device, a set of triggers in a memory, each trigger of the set being configured to associate a respective program of a set of programs with one or more conditions stored in the memory, wherein a first one of the set of triggers is associated with a program identifier;
determining, by the one or more processors, that at least one of the one or more conditions associated with the first trigger has been satisfied;
determining, by the one or more processors, that the respective program is not currently installed in the computing device; and
in response to the determinations that the at least one of the one or more conditions associated with the first trigger has been satisfied and that the respective program is not currently installed, obtain an installation file from a location on a network identified by the program identifier, and install the respective program on the computing device using the installation file.

21. A non-transitory computing-device readable storage medium on which computing-device readable instructions are stored, the instructions, when executed by one or more computing devices, cause the one or more computing devices to perform a method that includes:
storing a set of triggers in a memory, each trigger of the set being configured to associate a respective program of a set of programs with one or more conditions stored in the memory, wherein a first one of the set of triggers is associated with a program identifier;
determining that at least one of the one or more conditions associated with the first trigger has been satisfied;
determining that the respective program is not currently installed in the computing device; and
in response to the determinations that the at least one of the one or more conditions associated with the first trigger has been satisfied and that the respective program is not currently installed, obtaining an installation file from a location on a network identified by the program identifier, and install the respective program on the computing device using the installation file.

\* \* \* \* \*